United States Patent [19]

Minjolle

[11] 4,343,604
[45] Aug. 10, 1982

[54] DIE FOR EXTRUDING CERAMIC MATERIAL TO FORM A BODY OF CELLULAR STRUCTURE, AND A METHOD OF OBTAINING SAID DIE

[75] Inventor: Louis Minjolle, Tarbes, France
[73] Assignee: Ceraver, Paris, France
[21] Appl. No.: 196,982
[22] Filed: Oct. 14, 1980

[30] Foreign Application Priority Data

Oct. 15, 1979 [FR] France ................... 79 25557

[51] Int. Cl.³ ........................................... B29F 3/00
[52] U.S. Cl. ............................... 425/192 R; 29/157 C;
29/425; 29/447; 29/DIG. 26; 29/DIG. 35;
264/177 R; 264/209.1; 425/467; 425/380;
425/461; 425/464
[58] Field of Search ............... 425/464, 463, 461, 380,
425/466–467, 192 R; 29/DIG. 26, DIG. 35,
447, 425, 157 C; 264/177 R, 209.1

[56] References Cited

U.S. PATENT DOCUMENTS

| | | | |
|---|---|---|---|
| 1,874,503 | 8/1932 | Greenwood | 425/463 |
| 2,387,214 | 10/1945 | Corey | 29/425 |
| 2,908,037 | 10/1959 | Harkenrider | 425/381 |
| 3,075,241 | 1/1963 | Dietzsch et al. | 425/463 |
| 3,188,724 | 6/1965 | Bates et al. | 29/447 |
| 3,562,879 | 2/1971 | Cremer et al. | 425/380 |
| 3,609,808 | 10/1971 | Jacobi et al. | 18/12 |
| 3,790,654 | 2/1974 | Bagley | 264/56 |
| 3,803,951 | 4/1974 | Bagley | 76/107 |
| 3,837,783 | 9/1974 | Bagley | 425/464 |
| 3,856,448 | 12/1974 | Iijima et al. | 425/381 |
| 3,923,444 | 12/1975 | Esper | 425/461 |
| 4,168,944 | 9/1979 | Morikawa et al. | 425/464 |
| 4,235,583 | 11/1980 | Reed | 425/464 |

FOREIGN PATENT DOCUMENTS

1189404 4/1970 United Kingdom ............ 264/209.1
2004228 3/1979 United Kingdom .

Primary Examiner—Jeffery R. Thurlow
Attorney, Agent, or Firm—Sughrue, Mion, Zinn, Macpeak & Seas

[57] ABSTRACT

The invention relates to the manufacture of a body of a cellular structure by extruding a ceramic material through a die. The die comprises a succession of coaxial components (6, 10) fitted one round another, with two adjacent components defining between them longitudinal ducts (2) whose downstream ends communicate with an annular duct (3) and wherein the bottoms of said coaxial components fitted one round another have essentially radial notches (4) level with the annular ducts, the width of said notches being less than that of the longitudinal ducts, so that the ceramic material which flows through said longitudinal ducts is evenly distributed in the annular ducts and in the radial notches to form a body with a cellular structure directly on extrusion.

The invention has application to thin-walled honeycomb ceramic structures.

10 Claims, 5 Drawing Figures

DIE FOR EXTRUDING CERAMIC MATERIAL TO FORM A BODY OF CELLULAR STRUCTURE, AND A METHOD OF OBTAINING SAID DIE

The present invention relates to manufacturing bodies of cellular structure by extruding ceramic material.

BACKGROUND OF THE INVENTION

U.S. Pat. No. 3,837,783 describes a die for extruding bodies of cellular structure (in particular bodies made of ceramic materials). The design of that die is monolithic and includes feed ducts made through a solid member, the downstream ends of said ducts communicating with a network of interconnected discharge slots organized in a grating configuration with the extruded material emerging directly via said slots; since the ducts are longitudinal, it is necessary to impede the longitudinal flow of the material to promote lateral flow of part thereof so as to cause the material extruded from different ducts to join together, this makes it possible to form directly the various cellular structures defining walls of the body.

A die of that type is not suitable when it is required to extrude bodies of large cross-section, e.g. a cylindrical structure 200 mm in diameter. Indeed, the part which has holes at many locations to define the ducts must necessarily be very thick for it to have sufficient mechanical strength to withstand high feed pressures. This makes it necessary to provide holes which are very long with respect to their bores and the length-to-bore ratio then greatly exceeds 10 which is generally considered unfavourable. This is a great but inevitable limitation when using present techniques based on this principle.

The invention aims to improve the design of conventional monolithic tooling by providing a strong die which is suitable for extruding bodies of large cross-section but which remains easy to produce using ordinary machining techniques.

SUMMARY OF THE INVENTION

The invention provides more particularly a die for extruding ceramic material to manufacture a body of cellular structure, said die comprising a succession of coaxial components fitted one round another, with successive adjacent components defining between them longitudinal ducts whose downstream ends communicate with an annular duct and wherein the bottoms of said coaxial components fitted one round another have essentially radial notches level with the annular ducts, the width of said notches being less than that of the longitudinal ducts, so that the ceramic material which flows through said longitudinal ducts is evenly distributed in the annular ducts and in the radial notches to form a body of a cellular structure directly on extrusion.

A die according to the invention may also have at least one of the following features:

- the coaxial components which are fitted one round another include an inner central component which forms a punch, and a succession of intermediate components fitted successively one round another from said central component up to an outer component which forms a support nozzle, said radial notches being provided exclusively at the downstream ends of said intermediate components;
- the coaxial components which are fitted one round another are interconnected by directly shrinking one component onto an adjacent component which it surrounds, the upstream ends of the intermediate components and the inner central component have shoulders to allow each component to press against the component fitted round it, in which case said components define on the outside, a tapering stack whose top is represented by the inner central component which tapers towards the upstream end;
- the annular ducts defined by the inner central component and the intermediate component adjacent to it and by the outer component and the intermediate component adjacent to it are wider than the annular ducts defined by two intermediate components adjacent to each other;
- the annular ducts are defined by a circular groove formed on the outside at the downstream end of the central component and of the intermediate components and by the outer surface of the component adjacent to these intermediate components; advantageously the annular groove of the central component is defined by a retractable portion which is fixed on said component, said portion having substantially the shape of a frusto-conical washer in its part which protrudes from said component and said annular ducts taper longitudinally towards the downstream end due to a slight slope of the undercut annular grooves; and
- the components are essentially cylindrical with a central common axis.

The invention also relates to a method of manufacturing the die, wherein an annular groove is formed at the downstream end of a first component and a series of longitudinal grooves is formed all round its radial outer surface, wherein a second component is fitted round said first component when the latter has thus been machined, and wherein an annular groove and longitudinal grooves analogous to those which have just been mentioned hereinabove are formed on said second component and so on, progressively until the complete die is formed. Advantageously, for each component, the annular groove is formed before the longitudinal grooves; lastly, preferably, the radial notches are formed in the final step by machining simultaneously all the concerned components which are fitted one round another.

DETAILED DESCRIPTION

Figure 1:
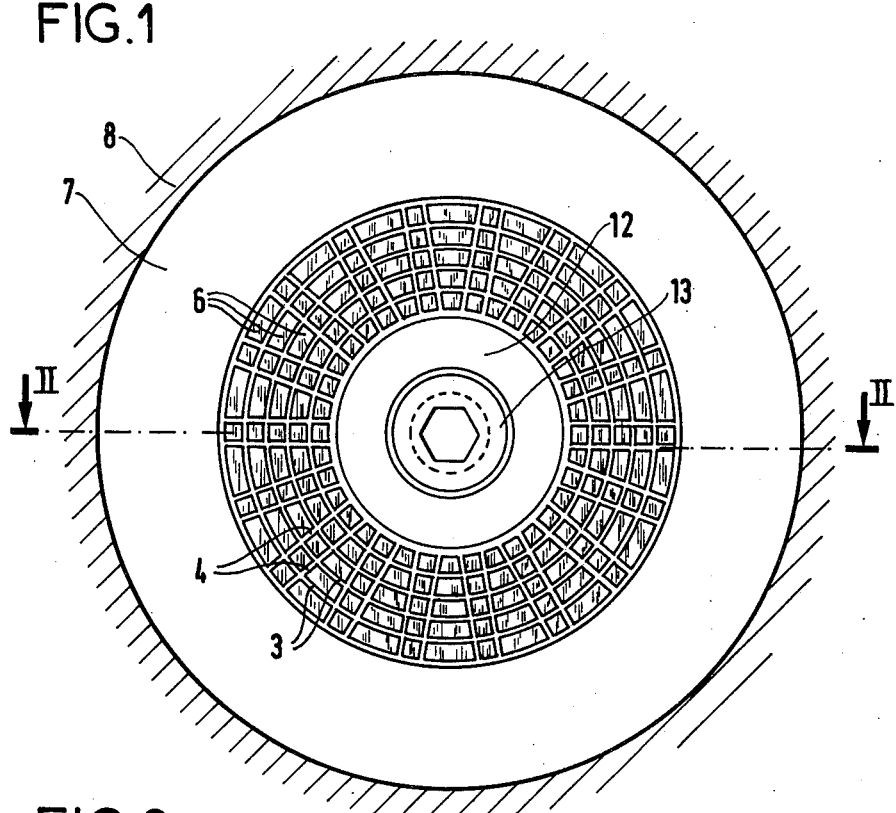
FIG. 1 is a bottom plan view of a die in accordance with the invention and showing in particular, the type of grating obtained for extruding the ceramic material.
Figure 2:
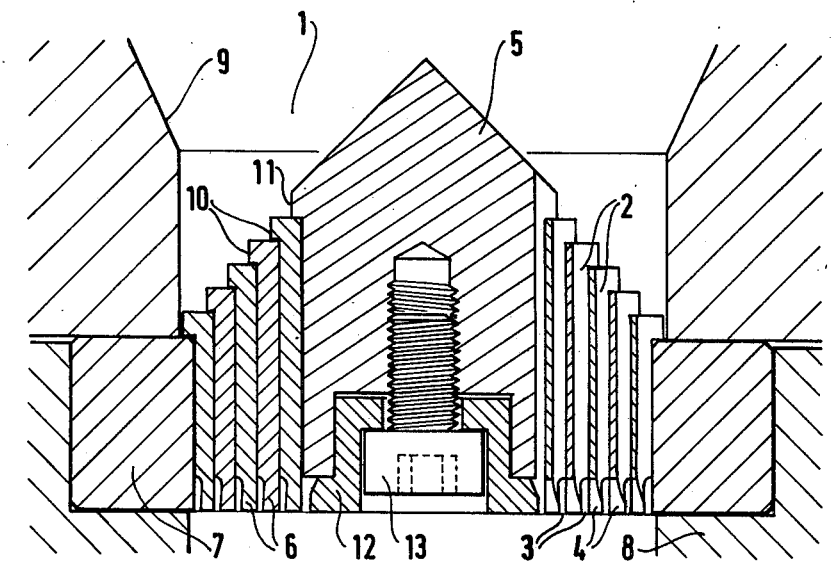
FIG. 2 is the cross-section about line II—II of FIG. 1 illustrating a variant die with intermediate components in a stepped ring configuration, the components being fitted one round another from a central component.

FIGS. 1 and 2 show a die 1 in accordance with the invention, said die being formed essentially by a succession of coaxial steel cylindrical components fitted one round another. Two adjacent cylindrical components define between them longitudinal passages 2 whose downstream ends communicate with annular ducts 3 formed therein. The coaxial components are also notched as shown by reference 4 at their lower ends, level with the annular ducts 3, said notches being essentially radial and being narrower than the longitudinal ducts 2 so that the ceramic material which flows through said longitudinal ducts is evenly distributed in the annular ducts 3 and in the radial notches 4 to form a body of cellular structure directly on extrusion.

Here, the coaxial components thus fitted one round another, include a central inner component 5 which forms a punch and a succession of thin intermediate cylindrical components 6 fitted successively, one round another, starting from said central component and outwardly to an outer component 7 which forms a support nozzle. The radial notches 4 are provided exclusively on the downstream ends of said intermediate components 6; to complete the apparatus, FIG. 2 schematically illustrates its support units. These include essentially a centering means 8 and a feed cone 9.

Naturally, the coaxial components, fitted one round another, must be interconnected so as to be able to withstand high feed pressures without any danger of any such component being axially driven out. To do this, several solutions are possible: firstly, one component can be shrink fitted directly with the adjacent component which it surrounds. This entails very accurate and tricky positioning of the parts to be shrink fitted (especially as the operation will be performed essentially by a thermal method in which either the inner component is cooled or the outer component is heated before the components are fitted together and then the hotter component is subsequently allowed to cool) or secondly the components can be brazed together (this minimizes the stresses applied). A further solution which is simpler to put into practice and which is illustrated here, consists in providing differing lengths to components 6 and providing the upstream ends of the intermediate components 6 and of the inner central components 5 with respective shoulders 10 and 11 which enable each component to rest against the component fitted around it. Despite the fact that this promotes loss of head because the upstream portions of the parts are staggered—a disadvantage which does not occur in the two preceding solutions since it was possible to locate the upstream edges of the components at the same level—the latter solution nevertheless has the advantage of easy (force) fitting and of high overall precision for the fitted assembly.

It can already be seen that this design provides considerable advantages in obtaining bodies of large cross-section, since it is quite possible to have the die components extending a long way upwardly with completely reliable overall transmission of thrust, and there is nothing against using components which are several centimeters high, with heights extending up to a value substantially equal to the diameter, thereby opening the way to production of bodies with a cross-section diameter of at least 200 mm, and this can be achieved without having to drill excessively long holes.

Here, therefore, a progressive stack is illustrated whose top is represented by the central sleeve which tapers down towards the upstream end to promote proper distribution of the material coming through the feed cone.

The annular ducts 3 defined firstly by the central sleeve 5 and the intermediate component 6 adjacent thereto and secondly by the outer component 7 and the intermediate components 6 adjacent thereto are advantageously larger than the annular ducts defined by two adjacent intermediate components: indeed, this makes it possible to provide an extruded body with thicker outer and inner side walls thereby increasing the mechanical strength of said body—a feature which is very important if long bodies (e.g. 1 m long) are envisaged.

Figure 3:
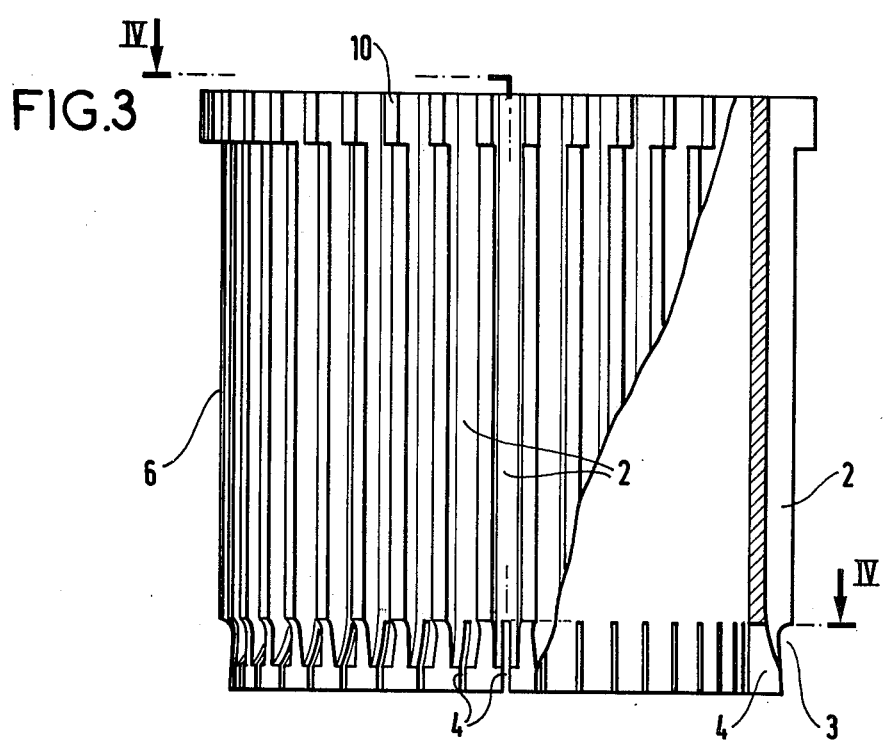
FIG. 3 is a partial cross-section of an intermediate component for the embodiment of FIGS. 1 and 2 ready to be fitted round another component.
Figure 4:
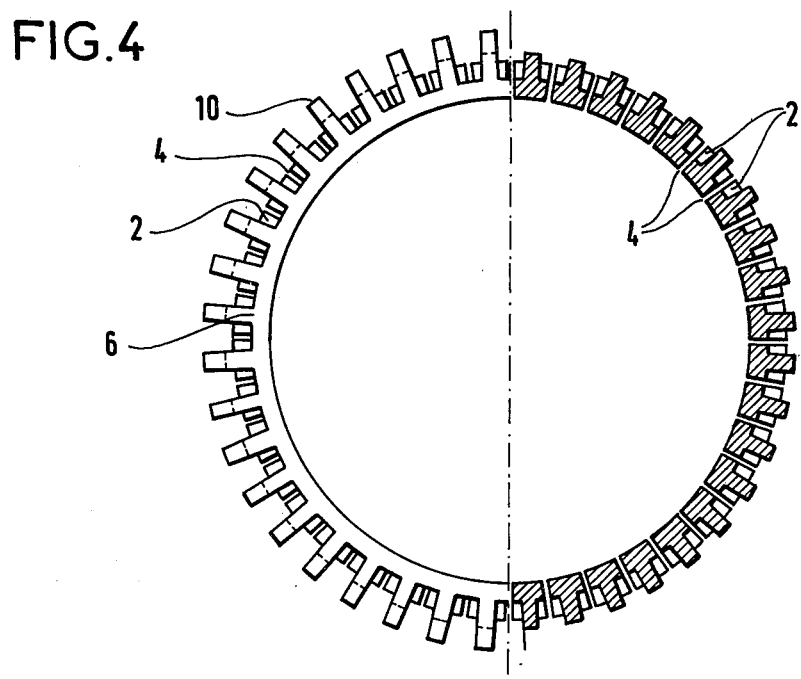
FIG. 4 is a partial plan and sectional view of the component illustrated in FIG. 3 taken about lines IV—IV of FIG. 3.

These annular ducts 3 are here defined firstly by an annular groove formed on the outside at the downstream end of the central sleeve 5 and of the intermediate components 6 and secondly by the inner surface of the component adjacent to parts 5 and 6. The advantageous embodiment illustrated here relates to the central component 5 whose annular groove is defined by a removable portion 12, FIG. 2, which is fixed by a screw 13, said part 5 having substantially the form of a frustoconical washer in its part which protrudes from said components. The advantage of this feature will be better understood from the description of the method given further on. Preferentially, the annular ducts 3 taper longitudinally towards the downstream end due to a light slope (e.g. 3°) of the undercut annular grooves (see FIG. 3, for example): this is obviously advantageous because it facilitates connection of the substance between two adjacent ducts; it must be stated that said undercut which is made possible, as set forth further on, by machining any component fitted onto the preceding one(s), is not possible with presently designed extrusion tooling which uses, for example, a rotating electrode for electro-erosion.

Lastly, it must be stated that the components, which are generally made of metal (stainless steel or steel which is treated for various types of corrosion proofing), are here cylindrical and have a common central axis, this giving bodies whose cellular structure is defined by radial and circular partitions, but other types, e.g. square or rectangular, components can be envisaged (the outlet grating then having a square or rectangular mesh), but these types of component are more complicated to machine.

As stated hereinbefore, the invention also relates to a method of manufacturing the die which has just been described and the successive steps to the method are schematically illustrated in FIGS. 5A to 5G.

Figure 5A:
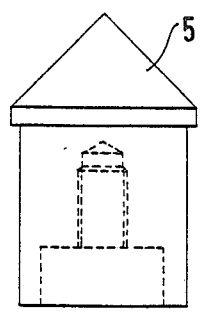
FIGS. 5A to 5G illustrate schematically the various successive steps of the method in accordance with the invention by which the complete die illustrated in FIGS. 1 and 2 can be assembled.

In FIG. 5A, the central component is positioned without its removable portion.

Figure 5B:
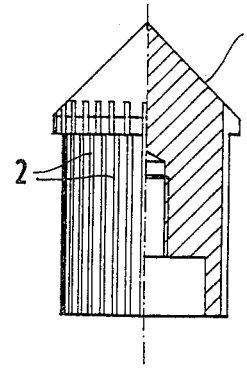

In FIG. 5B, notches are provided by longitudinal milling or grinding (the rounded ends of the ducts in FIG. 2 have the appearance of being milled with a disk-type milling tool), the number and dimensions of said notches being provided in advance and the substantially solid part is sufficiently rigid to be thus machined.

Figure 5C:
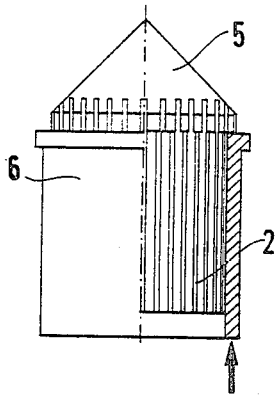

FIG. 5C shows an intermediate component 6 on the central component 5 and prior to machining of the intermediate component 6.

Figure 5D:
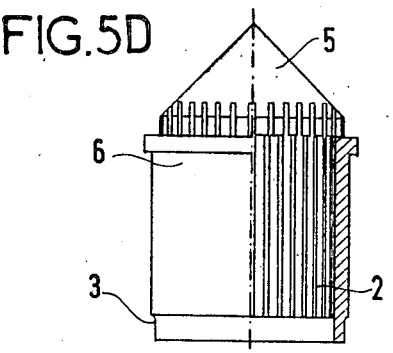
Figure 5E:
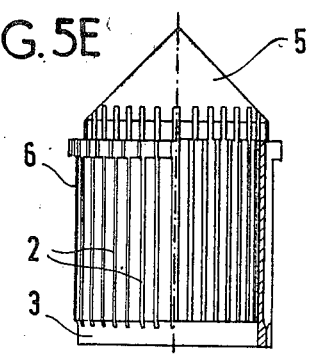

In FIGS. 5D and 5E, the annular groove is formed at the end of the component 6 and, preferably, afterwards, notches are formed by longitudinal machining. The thin component 6 is made rigid by the central component which it surrounds, so that there is practically no danger of breaking the part during machining; these operations are repeated until the required stacking is obtained, the intermediate component to be machined having, each time, the benefit of the support of the preceding components which it surrounds.

Figure 5F:
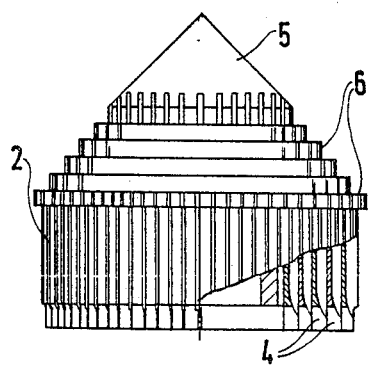

FIG. 5F shows how the notches 4 of all the intermediate components (here, twice eighteen notches) are simultaneously formed, e.g. by means of a fret saw. This makes it possible to obtain walls of cellular structure whose thickness can be as little as 0.1 mm.

Figure 5G:
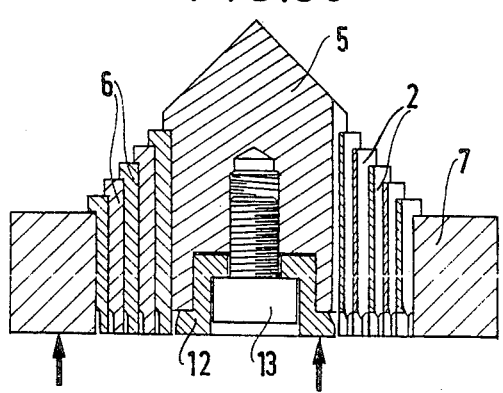

FIG. 5G shows the removable portion 12 of the central component, as well as the outer component 7, fitted in position (this is performed only, since the pressure of these two parts would have prevented the notches from being sawn out), and the device is ready to be assembled and to operate.

It should be observed that extrusion, while shown in the vertical position, may be in a horizontal direction. In the latter case, the ceramic material has a high shearing threshold and a mat can then be used to receive the extruded portion (which need only be cut to the required length) and moves at a speed which may be made dependent on the extrusion speed of the material.

I claim:

1. A die for extruding a ceramic material to manufacture a body of cellular structure, said die comprising a succession of elongated thin wall tubular coaxial components fitted one around another, said elongated thin wall tubular coaxial components including integrally radial shoulders at their upstream ends projecting radially outwardly and overlying the upstream ends of the immediately adjacent tubular coaxial components radially outwardly thereof, means forming between successive radially adjacent components, longitudinal ducts, means defining annular ducts communicating with the downstream ends of said longitudinal ducts, the bottoms of said coaxial components being fitted, one around another, and having essentially radial notches level with the annular ducts, and the width of said notches being less than that of the longitudinal ducts, so that the ceramic material which flows through said longitudinal ducts is evenly distributed in the annular ducts and in the radial notches to form a body of cellular structure directly on extrusion, and wherein the coaxial components which are fitted one around another include an inner, central component bearing a radially outwardly projecting shoulder at the upstream end thereof overlying the upstream end of the immediately adjacent elongated thin wall tubular coaxial component with a succession of intermediate components radially fitted successively one around another from said central component up and to an outer radial component and wherein said outer radial component forms a support nozzle, and wherein said radial notches are provided exclusively at the downstream ends of said intermediate components.

2. A die according to claim 1, wherein the coaxial components which are fitted one round another are interconnected by directly shrinking one component onto an adjacent component which it surrounds.

3. A die according to claim 1, wherein the coaxial components which are fitted one round another define on the outside a tapering stack whose top is represented by said inner central component which tapers towards the upstream end.

4. A die according to claim 10, wherein the annular ducts defined by the inner central component and the intermediate component adjacent to it and by the outer component and the intermediate component adjacent to it are wider than the annular ducts defined by two intermediate components adjacent to each other.

5. A die according to claim 1, wherein the annular groove of the central component is defined by a removable portion which is fixed on said component, and said removable portion having substantially the shape of a frusto-conical washer in its portion which protrudes from said central component.

6. A die according to claim 1 or 5, wherein said annular ducts taper longitudinally towards the downstream end due to a slight slope of the undercut annular grooves.

7. A die according to claim 1, wherein the components are essentially cylindrical with a central common axis.

8. A method of manufacturing a die for extruding a ceramic material to produce a body of cellular structure, said die comprising a succession of elongated thin wall coaxial components concentrically fitted one around another, successive radially adjacent components defining between them longitudinal ducts, annular ducts communicating with the downstream ends of said longitudinal ducts, the bottoms of said coaxial components being fitted, one around another, and having essentially radial notches level with the annular ducts, and the width of said notches being less than that of the longitudinal ducts, so that the ceramic material which flows through the longitudinal ducts is evenly distributed in the annular ducts and in the radial notches to form a cellular structure directly on extrusion, said method comprising:

forming a radially outwardly directed shoulder on the upstream end of a first, inner tubular component, forming an annular groove at the downstream end of said first, inner tubular component, forming a series of longitudinal grooves at circumferentially spaced positions around the radial outer surface of said first tubular component extending the length thereof and through said radially outwardly directed shoulder, forming a radially outwardly directed shoulder on a second tubular component and fitting said second tubular component concentrically about said first tubular component, subsequently machining said second tubular component to provide an annular groove and longitudinal grooves analogous to those on said first component, and progressing in similar steps regarding said successive radially adjacent components to create said die capable of extruding a body of cellular structure directly from the downstream end of said die, and wherein said radial shoulders fix the positions of said succession of said elongated thin wall tubular coaxial components concentrically about each other while permitting free flow of ceramic material through said longitudinal grooves passing through said shoulders.

9. A method according to claim 8, wherein for each component, the annular groove is formed before the longitudinal grooves.

10. A method according to claim 8, wherein the radial notches are formed in the final step by machining simultaneously all the concerned components which are fitted one round another.

* * * * *